(12) United States Patent
Uchiyama

(10) Patent No.: US 8,794,404 B2
(45) Date of Patent: Aug. 5, 2014

(54) HYDRAULIC SHOCK ABSORBER

(75) Inventor: Mikio Uchiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1185 days.

(21) Appl. No.: 12/719,591

(22) Filed: Mar. 8, 2010

(65) Prior Publication Data

US 2010/0236882 A1    Sep. 23, 2010

(30) Foreign Application Priority Data

Mar. 23, 2009 (JP) ................. 2009-070162

(51) Int. Cl.
*F16F 9/00* (2006.01)
*F16F 9/44* (2006.01)

(52) U.S. Cl.
USPC ...................... 188/319.1; 188/313

(58) Field of Classification Search
USPC ............ 188/313, 316, 317, 319.1, 322.13, 188/322.15, 283, 284, 288, 289
See application file for complete search history.

(56) References Cited

U.S. PATENT DOCUMENTS

| | | | | |
|---|---|---|---|---|
| 4,096,928 A | * | 6/1978 | Krafzig et al. | 188/282.5 |
| 4,284,178 A | * | 8/1981 | Tomita et al. | 188/281 |
| 6,382,370 B1 | * | 5/2002 | Girvin | 188/299.1 |
| 8,302,746 B2 | * | 11/2012 | Azekatsu | 188/322.15 |
| 2002/0027051 A1 | * | 3/2002 | Grundei | 188/322.15 |
| 2005/0061592 A1 | * | 3/2005 | Heyn et al. | 188/282.3 |
| 2006/0006030 A1 | * | 1/2006 | Satou et al. | 188/317 |

FOREIGN PATENT DOCUMENTS

| | | | |
|---|---|---|---|
| JP | 2006-029430 | * | 2/2006 |
| JP | 3887107 B2 | | 2/2007 |

* cited by examiner

*Primary Examiner* — Vishal Sahni
(74) *Attorney, Agent, or Firm* — Squire Patton Boggs (US) LLP

(57) ABSTRACT

In a hydraulic shock absorber 10, a piston holder 41 has an axial side surface 41*e* formed with an opening of an inclined hole 48*b* exposed to a rod-side oil chamber 43B. A block ring 71 capable of closing the opening of the inclined hole 48*b* is provided around a piston rod body 22 at a position between the axial side surface 41*e* of the piston holder 41 and the upper end of a rebound spring 32.

14 Claims, 7 Drawing Sheets

(a)

(b)

(a)

(b)

HYDRAULIC SHOCK ABSORBER

BACKGROUND

1. Field

Embodiments of the present invention relate to a hydraulic shock absorber interposed between a vehicle body and a wheel for absorbing shock from a road surface.

2. Description of the Related Art

A conventional hydraulic shock absorber includes a cylinder, a piston rod having a slidable piston inserted in the cylinder, an oil passage formed in the piston so as to make the communication of oil chamber defined on both sides of the piston, and a bypass passage formed in the piston rod so as to make the communication of the oil chambers. Further, in order to reduce a change in attitude of a vehicle body in the case of maximum expansion of the hydraulic shock absorber, the sectional area of the bypass passage is reduced by using an open/close rod to thereby increase a damping force (see Japanese Patent No. 3887107, for example).

In the hydraulic shock absorber described in Japanese Patent No. 3887107, a damping force can be increased in the case of maximum expansion by reducing the sectional area of the bypass passage. However, a push rod is used to reduce the sectional area of the bypass passage, causing a cost increase. Further, no consideration is given to the complete closure of the bypass passage.

SUMMARY

It is accordingly an object of the present invention to provide a hydraulic shock absorber which can exhibit a large damping force in the case of maximum expansion.

In accordance with embodiments of the invention, there is provided a hydraulic shock absorber including a body-side tube; a wheel-side tube slidably engaged with the body-side tube; a damper cylinder axially extending in the body-side tube; a piston rod axially extending in the wheel-side tube and inserted in the damper cylinder; a piston provided on the piston rod so as to slide on the inner circumferential surface of the damper cylinder and partition the inside space of the damper cylinder into a rod-side oil chamber and a piston-side oil chamber, the piston having a damping force generating device; a bypass passage formed in the piston so as to make the communication of the piston-side oil chamber and the rod-side oil chamber, the bypass passage being composed of a first hole communicating with the piston-side oil chamber and a second hole communicating with the first hole and the rod-side oil chamber; and a rebound spring supported at one end thereof by an end member mounted to a lower opening portion of the damper cylinder and adapted to be compressively deformed in the case of maximum expansion of the piston rod; wherein the piston rod has an axial side surface formed with an opening of the second hole exposed to the rod-side oil chamber; and a block ring having a surface axially opposed to the opening of the second hole is provided around the piston rod at a position between the axial side surface of the piston rod and the other end of the rebound spring, when the hydraulic shock absorber is expanded, the surface of the block ring comes into abutment against the axial side surface to close the opening of the second hole.

In accordance with an embodiment, a needle capable of adjusting the opening area of the bypass passage is provided in the piston rod.

In accordance with another embodiment, an annular stopper member abutting against the block ring biased by the rebound spring is fixed to the inner circumferential surface of the damper cylinder at a position above the end member. The piston rod is formed with a flange portion having the axial side surface, the outer diameter of the flange portion is smaller than the inner diameter of the stopper member, and the outer diameter of the block ring is larger than the inner diameter of the stopper member.

In accordance with one example, the piston rod is formed with a stepped cylindrical portion at a position below the flange portion, and a predetermined clearance is defined between the inner circumference of the block ring and the outer circumference of the stepped cylindrical portion of the piston rod radially opposed to each other in the case of maximum expansion of the piston rod.

In accordance with some embodiments, the outer circumferential surface of the block ring is in slidable contact with the inner circumferential surface of the damper cylinder, and the block ring has a plurality of axial through holes allowing the flow of oil.

In accordance with one embodiment of the invention, the outer circumferential surface of the block ring is formed with a plurality of sliding contact portions adapted to slide on the inner circumferential surface of the damper cylinder and a plurality of recesses radially recessed from the sliding contact portions and arranged in alternate relationship with the sliding contact portions, the flow of oil is allowed by the recesses.

In accordance with another embodiment, the block ring has a circular outer circumferential surface adapted to come into full slidable contact with the inner circumferential surface of the damper cylinder.

According to certain embodiments, the piston rod has the axial side surface formed with the opening of the second hole exposed to the rod-side oil chamber, and the block ring having a surface axially opposed to the opening of the second hole is provided around the piston rod at a position between the axial side surface of the piston rod and the other end of the rebound spring. When the hydraulic shock absorber is expanded, the surface of the block ring comes into abutment against the axial side surface to close the opening of the second hole. Accordingly, in the case of maximum expansion of the hydraulic shock absorber, the bypass passage can be completely closed to thereby produce a large damping force.

According to an embodiment, the needle capable of adjusting the opening area of the bypass passage is provided in the piston rod. Accordingly, the opening area of the bypass passage can be adjusted by moving the needle in the bypass passage, thereby adjusting the damping force by the bypass passage in a normal condition.

According to another embodiment, the annular stopper member abutting against the block ring biased by the rebound spring is fixed to the inner circumferential surface of the damper cylinder at a position above the end member, the piston rod is formed with the flange portion having the axial side surface, the outer diameter of the flange portion is smaller than the inner diameter of the stopper member, and the outer diameter of the block ring is larger than the inner diameter of the stopper member. Accordingly, in the case of maximum expansion of the hydraulic shock absorber, the rebound spring can be compressed without the interference of the piston rod and the stopper member. Further, in the condition where the rebound spring is not compressed by the piston rod, the rebound spring is held by the stopper member through the block ring.

According to one example, the piston rod is formed with the stepped cylindrical portion at a position below the flange portion, and the predetermined clearance is defined between the inner circumference of the block ring and the outer circumference of the stepped cylindrical portion of the piston rod radially opposed to each other in the case of maximum expansion of the hydraulic shock absorber. Accordingly, when the stepped cylindrical portion is moved in the block ring in the case of maximum expansion of the hydraulic shock absorber, the interference between the stepped cylindrical portion and the block ring can be prevented.

According to certain embodiments, the outer circumferential surface of the block ring is in slidable contact with the inner circumferential surface of the damper cylinder, and the block ring has the plural axial through holes allowing the flow of oil. Accordingly, the block ring can smoothly slide on the inner circumferential surface of the damper cylinder. Further, the blocking of oil flow by the block ring can be prevented owing to the formation of the axial through holes.

According to one embodiment, the outer circumferential surface of the block ring is formed with the plural sliding contact portions adapted to slide on the inner circumferential surface of the damper cylinder and the plural recesses radially recessed from the sliding contact portions and arranged in alternate relationship with the sliding contact portions, the flow of oil is allowed by the recesses. Accordingly, the block ring can smoothly slide on the inner circumferential surface of the damper cylinder. Further, the blocking of oil flow by the block ring can be prevented owing to the formation of the recesses.

According to embodiments of the invention, the block ring has the circular outer circumferential surface adapted to come into full slidable contact with the inner circumferential surface of the damper cylinder. Accordingly, in the case of maximum expansion of the hydraulic shock absorber, the block ring can completely block the flow of oil, thereby performing an oil lock operation.

DETAILED DESCRIPTION

Some embodiments of the present invention will now be described with reference to FIGS. 1 to 7.

Figure 1:
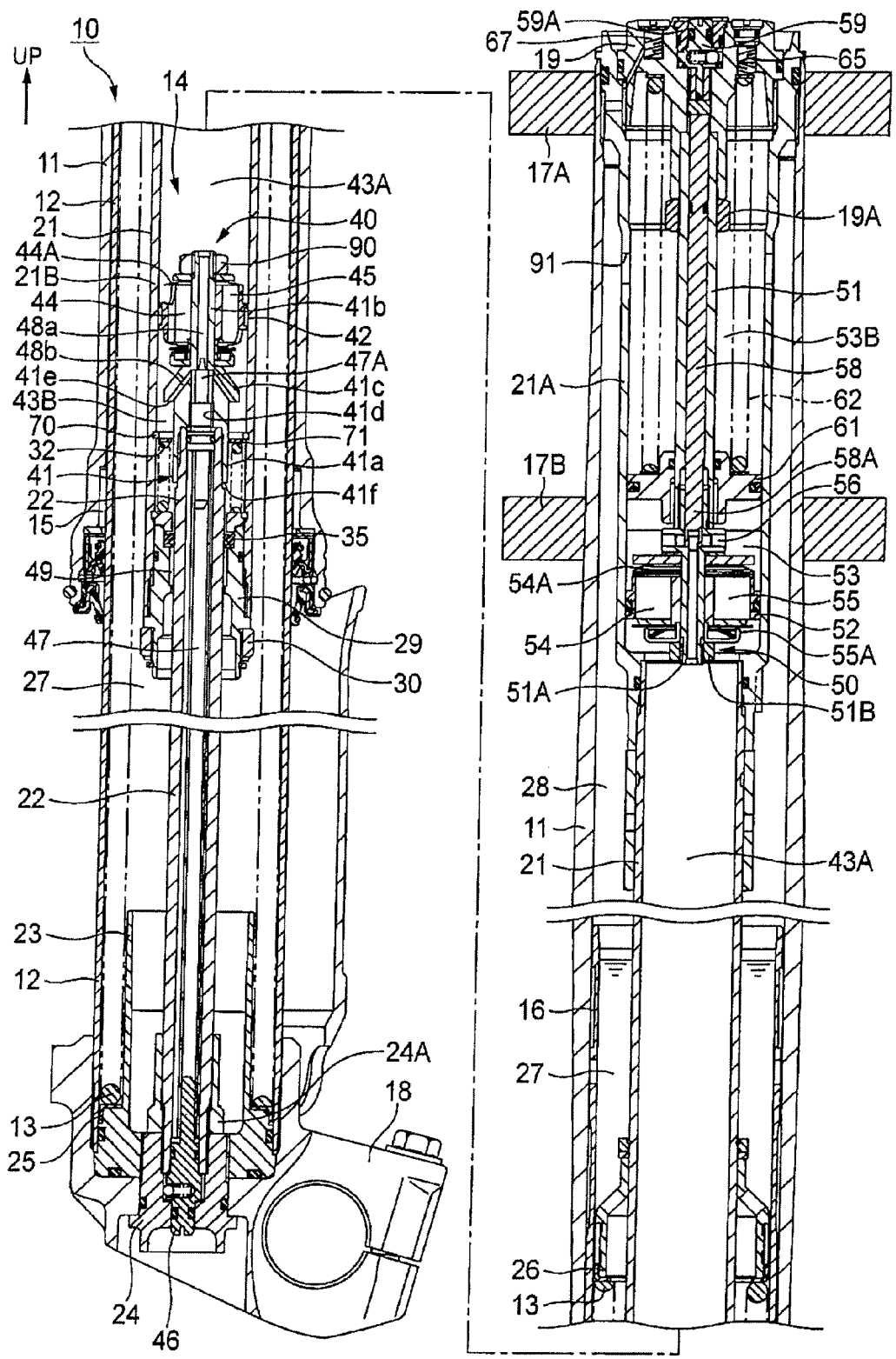
FIG. 1 is a partially cutaway, sectional view of a front fork according to one embodiment of the present invention.

Referring to FIG. 1, there is shown a front fork as a hydraulic shock absorber according to an embodiment of the present invention. The front fork 10 includes a body-side tube (outer tube) 11, a wheel-side tube (inner tube) 12 slidably inserted in the body-side tube 11, a suspension spring 13 interposed between the two tubes 11 and 12, and a multi-tube type damper 14 provided in the two tubes 11 and 12 in an inverted condition.

According to one embodiment, a bushing 15 is fitted to the inner circumference of the body-side tube 11 at its lower end portion. The outer circumference of the wheel-side tube 12 is in sliding contact with the bushing 15. A bushing 16 is fitted to the outer circumference of the wheel-side tube 12 at its upper end portion. The inner circumference of the body-side tube 11 is in sliding contact with the bushing 16.

The body-side tube 11 can be supported through an upper bracket 17A and a lower bracket 17B to a vehicle body. The wheel-side tube 12 can be connected through an axle bracket 18 to an axle.

An upper end portion of a damper cylinder 21 (upper cylinder tube 21A) constituting the damper 14 is threadedly engaged with an upper end portion of the body-side tube 11 through an O ring in a fluid-tight fashion. A fork bolt 19 is threadedly engaged with the inner circumference of the upper cylinder tube 21A through an O ring in a fluid-tight fashion. The upper end opening of the upper cylinder tube 21A is closed by the fork bolt 19. The damper cylinder 21 of the damper 14 can be composed of the upper cylinder tube 21A and a lower cylinder tube 21B joined together for the purpose of installing a base valve device 50 in the damper cylinder 21.

In some embodiments, an oil lock collar 23 is fitted to the inner circumference of the wheel-side tube 12 at its lower end portion through an O ring in a fluid-tight fashion. The oil lock collar 23 is fixed to the axle bracket 18 by a bottom bolt 24 through an O ring in a fluid-tight fashion. A base end portion of a piston rod body (hollow rod) 22 constituting the damper 14 is threadedly engaged with the bottom bolt 24 and locked by a lock nut 24A. A front end portion of the piston rod body 22 is inserted in the damper cylinder 21.

A seal cap 29 (end member) is threadedly engaged with a lower end opening portion of the damper cylinder 21, and a seal member 35 is mounted in the seal cap 29. The piston rod body 22 is inserted through the seal member 35 into the damper cylinder 21 (lower cylinder tube 21B). The seal member 35 functions to seal a rod-side oil chamber 43B of the damper cylinder 21 to be hereinafter described, thereby preventing the leakage of oil from the rod-side oil chamber 43B to the outside of the damper cylinder. A guide bushing 49 is inserted between the piston rod body 22 and the seal cap 29 at a position below the seal member 35. An oil lock piece 30 is loosely fitted to the outer circumference of the seal cap 29 at its lower end portion.

In one embodiment, the suspension spring 13 is interposed between a spring retainer 25, mounted on the outer circumferential surface of the oil lock collar 23 at its base end portion, and a spring retainer 26 fixed to the outer circumferential surface of the damper cylinder 21 (lower cylinder tube 21B) at its intermediate portion. An oil chamber 27 and a gas chamber 28 are defined in the body-side tube 11 and the wheel-side tube 12. Gas is confined in the gas chamber 28 to function as a gas spring. The elastic forces of the suspension spring and the above gas spring absorb an impactive force from a road surface to the vehicle.

In certain embodiments, the damper 14 has a piston valve device 40 and a base valve device 50. The piston valve device 40 and the base valve device 50 of the damper 14 generate damping forces to thereby suppress telescopic vibrations of the body-side tube 11 and the wheel-side tube 12.

The piston valve device 40 according to one embodiment will now be described. A base portion 41*a* of a piston holder 41 can be threadedly engaged with the front end portion of the piston rod body 22. A main piston 42 can be mounted on an upper cylindrical portion 41b of the piston holder 41 by threadedly engaging a nut 90. The main piston 42 is in sliding contact with the inner circumferential surface of the damper cylinder 21 to partition the inside space of the damper cylinder 21 into a piston-side oil chamber 43A where the piston rod body is not accommodated and a rod-side oil chamber 43B where the piston rod body 22 is accommodated. The main piston 42 includes an expansion-side passage 45 having an expansion-side valve 45A allowing the communication between the piston-side oil chamber 43A and the rod-side oil chamber 43B and a contraction-side passage 44 having a contraction-side valve 44A allowing the communication between the piston-side oil chamber 43A and the rod-side oil chamber 43B.

An adjuster 46 is rotatably supported in the bottom bolt 24, and a damping force adjusting rod 47 is connected to the adjuster 46. The damping force adjusting rod 47 is inserted in a hollow portion of the piston rod body 22. A needle 47A is formed at the front end of the damping force adjusting rod 47. By rotating the adjuster 46, the damping force adjusting rod 47 is axially moved in the hollow portion of the piston rod body 22. As a result, the needle 47A formed at the front end of the damping force adjusting rod 47 can adjust the opening area of a bypass passage 48 formed in the piston holder 41 so as to communicate with the piston-side oil chamber 43A and the rod-side oil chamber 43B.

Figure 2:
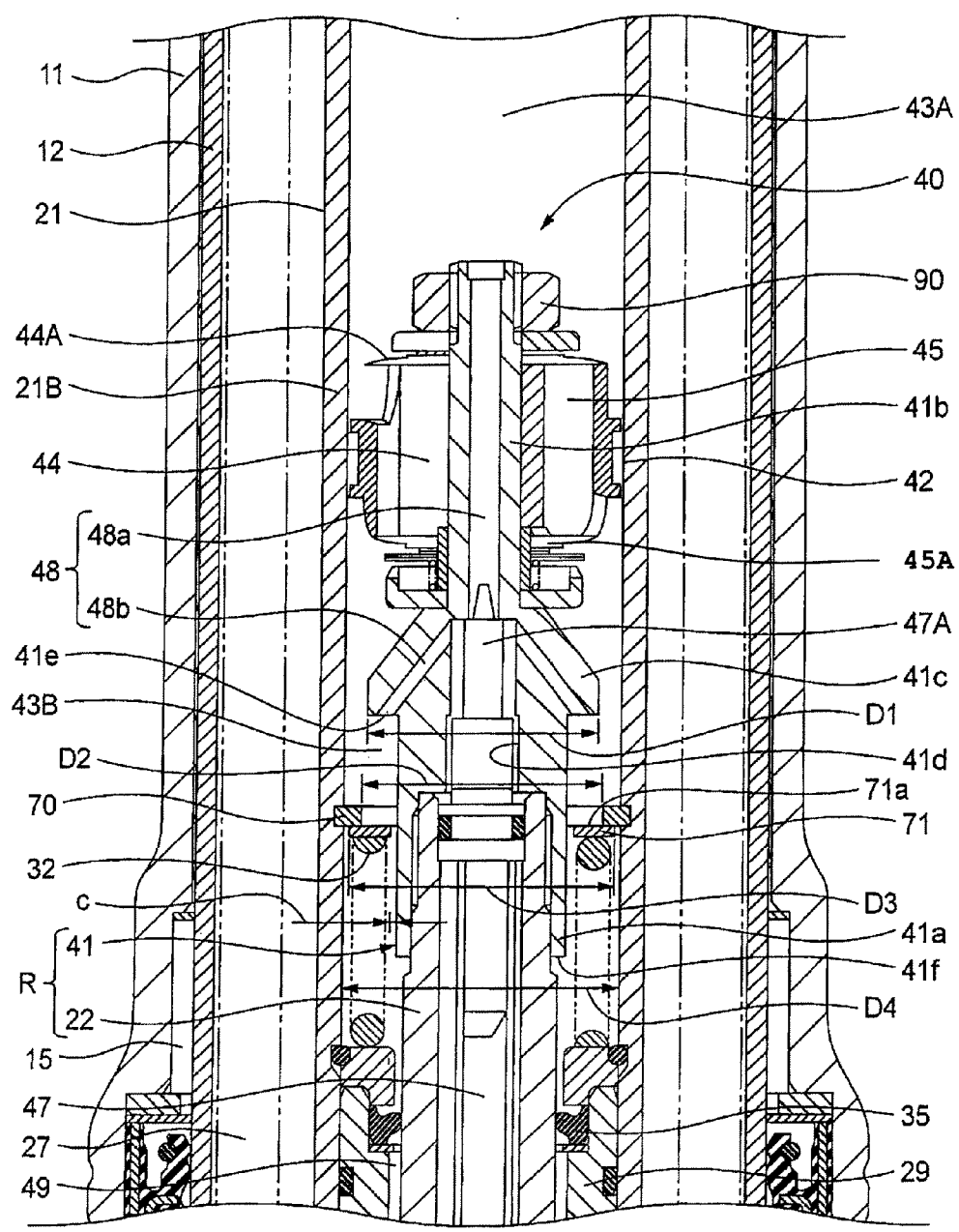
FIG. 2 is an enlarged sectional view of an essential part of the front fork shown in FIG. 1, showing a piston valve device and its peripheral portion.
Figure 3:
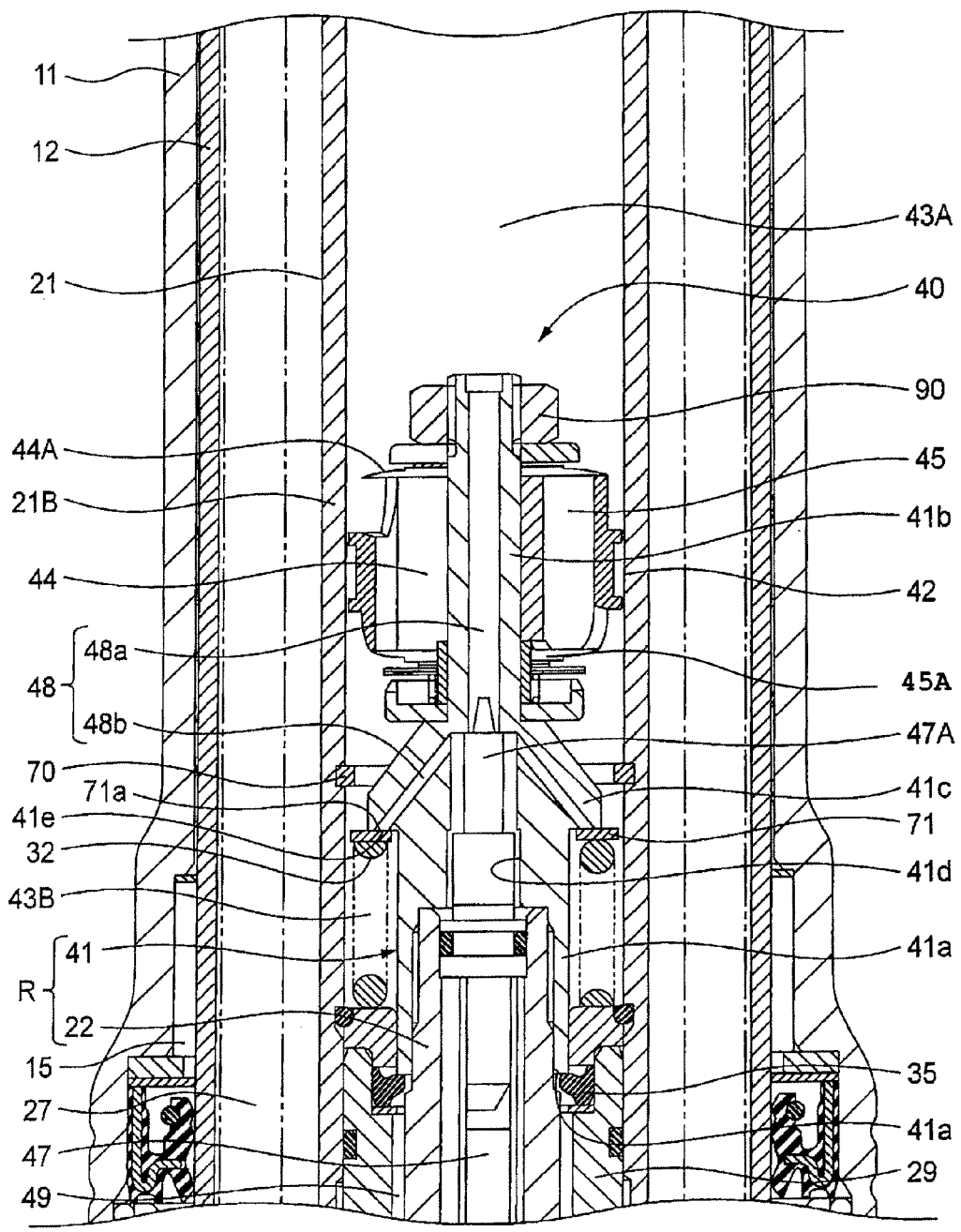
FIG. 3 is a view similar to FIG. 2, showing a maximum expanded condition of the front fork.
Figure 4:
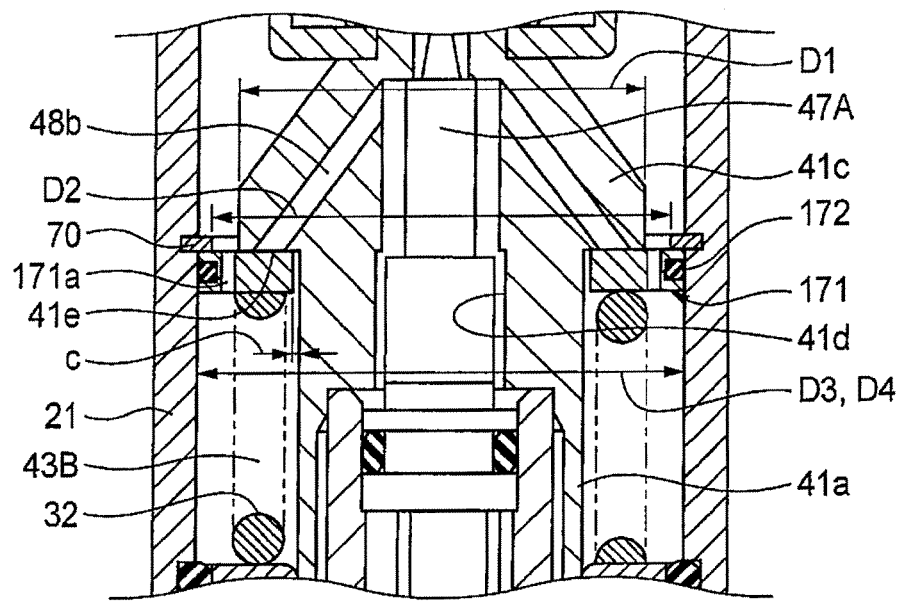
FIG. 4(*a*) is an enlarged sectional view of a part of a front fork according to an embodiment of the present invention, showing a block ring and its peripheral portion, and FIG. 4(*b*) is a plan view of the block ring shown in FIG. 4(*a*).
Figure 4:
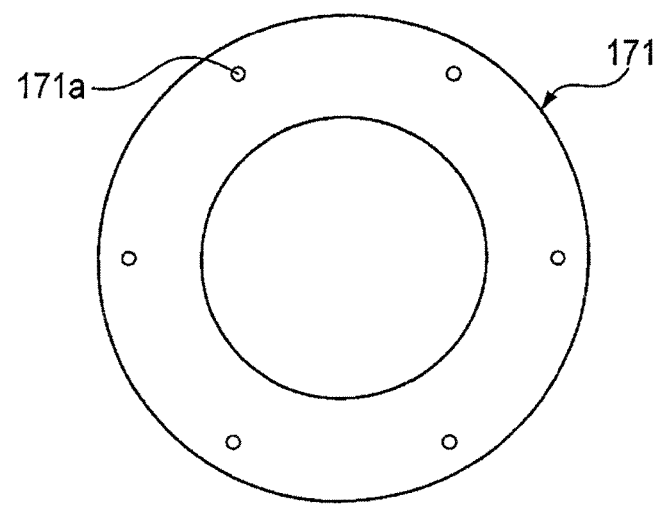

As shown in the example of FIG. 2, an axial hole 48a (first hole) axially extends in the upper cylindrical portion 41b of the piston holder 41 and communicates with the piston-side oil chamber 43A. A flange portion 41c is formed below the upper cylindrical portion 41b, and an inclined hole 48b (second hole) is formed in the flange portion 41c so as to extend obliquely downward from the lower portion of the axial hole 48a. The axial hole 48a and the inclined hole 48b constitute the bypass passage 48. The inclined hole 48b opens to an axially lower side surface 41e of the flange portion 41c so as to make the communication between the axial hole 48a and the rod-side oil chamber 43B. The base portion 41a of the piston holder 41 is formed with a needle accommodating hole 41d for accommodating the needle 47A and making the communication between the axial hole 48a and the inclined hole 48b. The piston rod body 22 and the piston holder 41 constitute a piston rod R, and the base portion 41a of the piston holder 41 constitutes a stepped large-diameter cylindrical portion of the piston rod R.

According to certain embodiments, a rebound spring is provided on the axially upper end surface of the seal cap 29. The rebound spring 32 is compressively deformed in the case of maximum expansion of the piston rod R. An annular stopper member 70 is fixed to the inner circumferential surface of the damper cylinder 21 at a position above the seal cap 29. A block ring 71 is provided around the piston rod R at a position between the stopper member 70 and the rebound spring 32.

Accordingly, one end of the rebound spring 32 is supported to the axially upper end surface of the seal cap 29. The other end of the rebound spring 32 is supported through the block ring 71 to the stopper member 70 in the compressed condition of the rebound spring 32.

According to certain embodiments, the outer diameter D1 of the flange portion 41c of the piston holder 41 is smaller than the inner diameter D2 of the stopper member 70, and the outer diameter D3 of the block ring 71 is larger than the inner diameter D2 of the stopper member 70. Accordingly, the block ring 71 biased by the rebound spring 32 can abut against the stopper member 70, and the block ring 71 can abut against the axially lower side surface of the flange portion 41c. Further, the outer diameter D3 of the block ring 71 may be smaller than the inner diameter D4 of the damper cylinder 21, thereby allowing the flow of oil in the damper cylinder 21 in the case of maximum expansion of the piston rod R.

The inner circumference of the block ring 71 is formed radially inside of the opening of the inclined hole 48b. Further, a predetermined clearance c is defined between the inner circumference of the block ring 71 and the outer circumference of the base portion 41a of the piston holder 41. This is to prevent the interference of a lower end portion 41f of the piston holder 41 and the block ring 71 in the case of maximum expansion of the piston rod R.

The base valve device 50 will now be described with reference to the embodiment shown in FIG. 1. A guide rod 51 is threadedly engaged with the fork bolt 19 and fixed by a lock nut 19A. A subpiston 52 is held to the front end portion of the guide rod 51 by a nut 51B. The subpiston 52 is in sliding contact with the inner circumference of the upper cylinder tube 21A and defines a subtank chamber 53 above the piston-side oil chamber 43A. The subpiston 52 includes a contraction-side passage having a contraction-side valve 54A allowing the communication between the piston-side oil chamber 43A and the subtank chamber 53. The subpiston 52 also includes an expansion-side passage 55 having an expansion-side valve 55A allowing the communication between the piston-side oil chamber 43A and the subtank chamber 53. A housing holder 51A is formed with a bypass passage 56 bypassing the contraction-side passage 54 and the expansion-side passage 55, and allowing the communication between the piston-side oil chamber 43A and the subtank chamber 53.

According to an embodiment, a damping force adjusting rod 58 is threadedly engaged with the fork bolt 19 and provided with an adjuster 59. The damping force adjusting rod 58 is inserted in the guide rod 51. A needle 58A is formed at the front end of the damping force adjusting rod 58. By rotating the adjuster 59, the damping force adjusting rod 58 is axially moved in the guide rod 51, so that the needle 58A formed at the front end of the damping force adjusting rod 58 can adjust the opening area of the bypass passage 56. The adjuster 59 and its holder 59A are embeddedly held in a central portion of the upper end of the fork bolt 19.

Further, in one embodiment, a free piston 61 is slidably fitted in the upper cylinder tube 21A so as to be guided along the guide rod 51 through an O ring and a bushing in a fluid-tight fashion. The free piston 61 defines a volume compensating chamber 53B containing air on the fork bolt 19 side so as to separate this chamber 53B from the subtank chamber 53 communicating with the piston-side oil chamber 43A on the subpiston 52 side. A spring 62 is interposed between the free piston 61 and the fork bolt 19 so as to have a predetermined initial pressure load. An air removing plug 65 can be detachably threadedly engaged with the fork bolt 19 at its upper end portion in order to remove the air having entered the gas chamber 28 from the sliding portion between the body-side tube 11 and the wheel-side tube 12 by the expansion and contraction of the front fork 10. Further, an adjusting plug 67, for adjusting the air pressure and oil quantity in the volume compensating chamber 53B, can be detachably threadedly engaged with the fork bolt 19 at its upper end portion. Further, the upper cylinder tube 21A defining the volume compensating chamber 53B is formed with a blow hole 91 for allowing the communication between the volume compensating chamber 53B and the gas chamber 28.

When the piston rod body 22 is moved forward and backward in the damper cylinder 21, the free piston 61 is moved to compensate for a change in oil quantity in the damper cylinder 21 corresponding to the displacement of the piston rod body 22 and a change in quantity of oil adhering to the piston rod body 22, passing through the seal member 35, and having entered the damper cylinder 21. When the piston rod body 22 is moved forward in the damper cylinder 21 in the case of contraction of the front fork 10, the spring 62 is compressed to apply a pressure to the oil chamber in the damper cylinder 21 corresponding to the spring load of the spring 62.

The damping operation of the front fork 10 according to one embodiment will now be described.

In the case of contraction of the front fork 10, the oil flows through the needle 58A or the contraction-side valve 54A of the subpiston 52 in the base valve device 50 to thereby produce a contraction-side damping force. More specifically, the oil in an amount corresponding to the displacement of the piston rod body 22 moved forward in the damper cylinder 21 is discharged from the piston-side oil chamber 43A through the bypass passage 56 or the contraction-side passage 54 of the subpiston 52 into the subtank chamber 53.

At this time, in the case that the velocity of the piston rod body 22 relative to the damper cylinder 21 is low, the oil passing through the bypass passage 56 undergoes restriction resistance by the needle 58A provided in the bypass passage 56, thereby obtaining a contraction-side damping force. This damping force can be adjusted by rotating the adjuster 59 to adjust the position of the needle 58A. In the case that the velocity of the piston rod body 22 relative to the damper cylinder 21 is medium or high, the oil passing through the contraction-side passage 54 flexibly deforms the contraction-side valve 54A to enter the subtank chamber 53, thereby producing a contraction-side damping force. On the other hand, in the piston valve device 40, the oil in the piston-side oil chamber 43A is passed through the contraction-side passage 45 to open the contraction-side valve 45A and enter the rod-side oil chamber 43B, thereby producing a contraction-side damping force preliminarily set as required.

In the case of expansion of the front fork 10, the oil flows through the needle 47A or the expansion-side valve 44A of the main piston 42 in the piston valve device 40 to thereby produce an expansion-side damping force. More specifically, in the case that the velocity of the piston rod body 22 relative to the damper cylinder 21 is low, the oil in the rod-side oil chamber 43B flows through the bypass passage 48 into the piston-side oil chamber 43A and undergoes restriction resistance by the needle 47A provided in the bypass passage 48, thereby producing an expansion-side damping force. This damping force can be adjusted by rotating the adjuster 46 to adjust the position of the needle 47A.

In the case that the velocity of the piston rod body 22 relative to the damper cylinder 21 is medium or high, the oil in the rod-side oil chamber 43B flows through the expansion-side passage 44 and flexibly deforms the expansion-side valve 44A to enter the piston-side oil chamber 43A, thereby producing an expansion-side damping force. On the other hand, in the base valve device 50, the oil in an amount corresponding to the displacement of the piston rod body 22 moved backward in the damper cylinder 21 is returned from the subtank chamber 53 through the expansion-side passage 55 of the subpiston 52 to the piston-side oil chamber 43A, thereby producing a desired damping force.

These contraction-side and expansion-side damping forces suppress the telescopic vibrations of the front fork 10.

In the case of maximum contraction of the front fork 10, the oil lock piece 30 provided at the lower end portion of the lower cylinder tube 21B of the damper cylinder 21 comes into engagement with the oil lock collar 23 provided at the lower end portion of the wheel-side tube 12, thereby compressing the oil between the oil lock piece 30 and the oil lock collar 23. Thus, an oil lock operation is performed to prevent bottoming of the damper 14.

In the case of maximum expansion of the front fork 10, the lower end surface of the flange portion 41c of the piston holder 41 provided on the piston rod body 22 comes into abutment against the block ring 71 biased by the rebound spring 32 supported to the seal cap 29 provided at the upper opening portion of the damper cylinder 21, thereby performing a shock absorbing operation upon maximum expansion.

In one embodiment, until the rebound spring 32 is compressively deformed to a maximum expanded condition of the front fork 10 after reaching the abutment of the lower end surface of the flange portion 41c of the piston holder 41, the opening of the inclined hole 48b of the bypass passage 48 is kept completely closed by the block ring 71. Therefore, a large damping force is obtained in the bypass passage 48.

Accordingly, the damping force produced in the bypass passage 48 is added to the damping force produced by the pass of the oil through the expansion-side valve 44A in the expansion-side passage 44, thereby increasing the damping force by the piston valve device 40.

According to this embodiment, the piston holder 41 has the axial side surface 41e formed with the opening of the inclined hole 48b exposed to the rod-side oil chamber 43B. The block ring 71, having a surface 71a axially opposed to the opening of the inclined hole 48b, is provided around the piston rod body 22 at a position between the axial side surface 41e of the piston holder 41 and the other end of the rebound spring 32. When the front fork 10 is expanded, the surface 71a of the block ring 71 comes into abutment against the axial side surface 41e to close the opening of the inclined hole 48b. Accordingly, in the case of maximum expansion of the front fork 10, the bypass passage 48 can be completely closed to thereby produce a large damping force.

Further, the needle 47A capable of adjusting the opening area of the bypass passage 48 can be provided in the piston holder 41. Accordingly, the opening area of the bypass passage 48 can be adjusted by moving the needle 47A in the bypass passage 48, thereby adjusting the damping force by the bypass passage 48 in a normal condition.

Further, in one embodiment, the annular stopper member 70 abutting against the block ring 71 biased by the rebound spring 32 is fixed to the inner circumferential surface of the damper cylinder 21 at a position above the seal cap 29. The piston holder 41 is formed with the flange portion 41c having the axial side surface 41e, the outer diameter D1 of the flange portion 41c is smaller than the inner diameter D2 of the stopper member 70, and the outer diameter D3 of the block ring 71 is larger than the inner diameter D2 of the stopper member 70. Accordingly, in the case of maximum expansion of the front fork 10, the rebound spring 32 can be compressed without the interference of the piston holder 41 and the stopper member 70. Further, in the condition where the rebound spring 32 is not compressed by the piston holder 41, the rebound spring 32 is held by the stopper member 70 through the block ring 71.

Further, the piston holder 41 is formed with the base portion 41a as the stepped large-diameter cylindrical portion of the piston rod R at a position below the flange portion 41c, and the predetermined clearance c is defined between the inner circumference of the block ring 71 and the outer circumference of the base portion 41a of the piston holder 41 radially opposed to each other in the case of maximum expansion of the front fork 10. Accordingly, when the base portion 41a is moved in the block ring 71 in the case of maximum expansion of the front fork 10, the interference between the base portion 41a and the block ring 71 can be prevented.

FIG. 4(a) is an enlarged sectional view of a part of a front fork according to an embodiment of the present invention, and showing a block ring 171 and its peripheral portion. FIG. 4(b) is a plan view of the block ring 171.

In this embodiment, the block ring 171 has an outer diameter D3 substantially equal to the inner diameter D4 of the damper cylinder 21. In other words, the outer circumferential surface of the block ring 171 is in slidable contact with the inner circumferential surface of the damper cylinder 21 through an O ring 172 or a slide bushing. Further, the block ring 171 has a plurality of axial through holes 171a allowing the flow of oil at a position radially outside of the flange portion 41c and radially inside of the stopper member 70. Accordingly, the block ring 171 can smoothly slide on the inner circumferential surface of the damper cylinder 21. Further, until the rebound spring 32 is compressively deformed to a maximum expanded condition of the front fork 10 after reaching the abutment of the lower end surface of the flange portion 41c of the piston holder 41, the blocking of oil flow by the block ring 171 can be prevented owing to the formation of the axial through holes 171a. In addition, the flow of oil is allowed by the axial through holes 171a at this time, so that the damping force can be adjusted by the axial through holes 171a.

Figure 5:
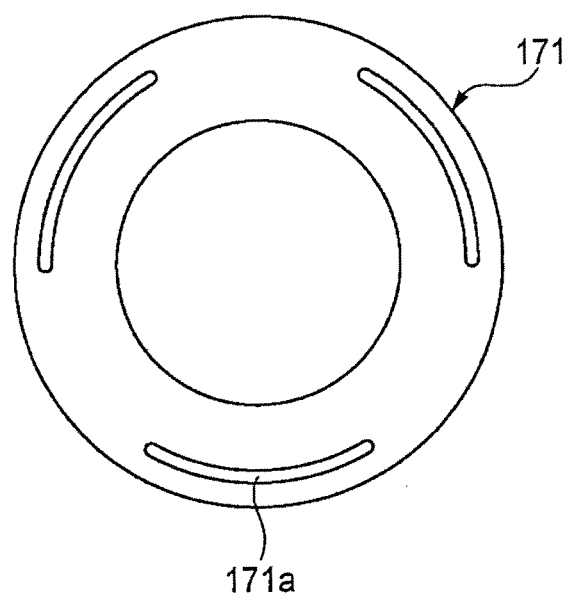
FIG. 5 is a plan view of a block ring according to another embodiment.
Figure 6:
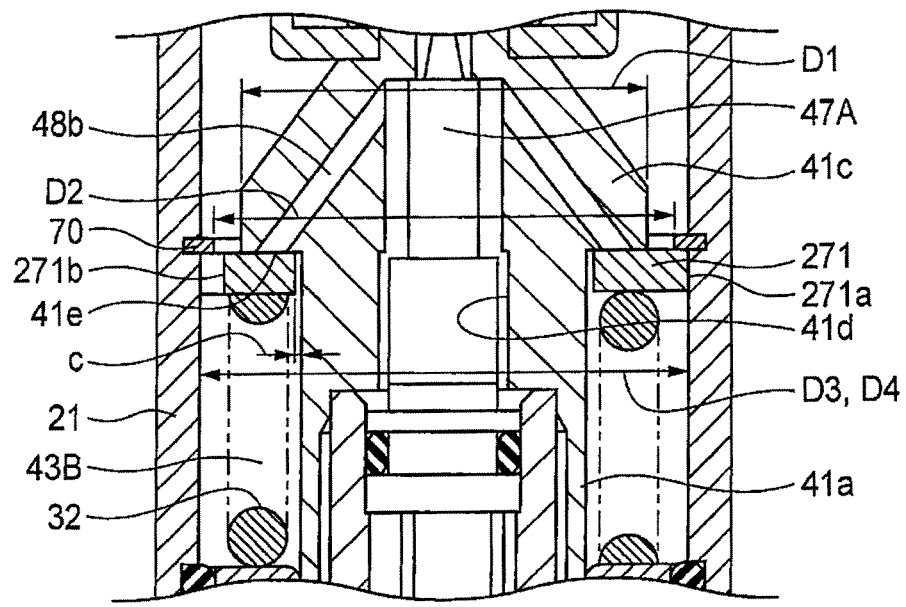
FIG. 6(*a*) is an enlarged sectional view of a part of a front fork according to one embodiment of the present invention, showing a block ring and its peripheral portion, and FIG. 6(*b*) is a plan view of the block ring shown in FIG. 6(*a*).
Figure 6:
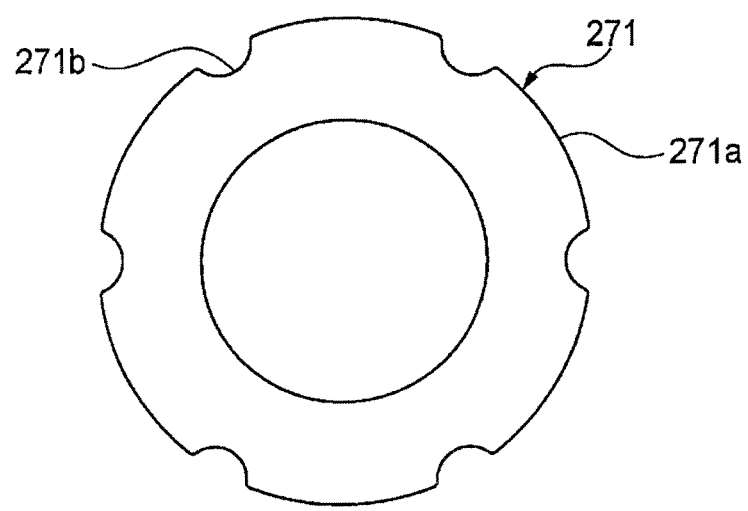

The remaining configuration and operation are similar to those described above in reference to FIGS. 1-3. As a modification, the axial through holes 171a as circular holes may be replaced by elongated holes as shown in FIG. 5.

FIG. 6(a) is an enlarged sectional view of a part of a front fork according to another embodiment of the present invention, and showing a block ring 271 and its peripheral portion. FIG. 6(b) is a plan view of the block ring 271 according to one embodiment.

Figure 7:
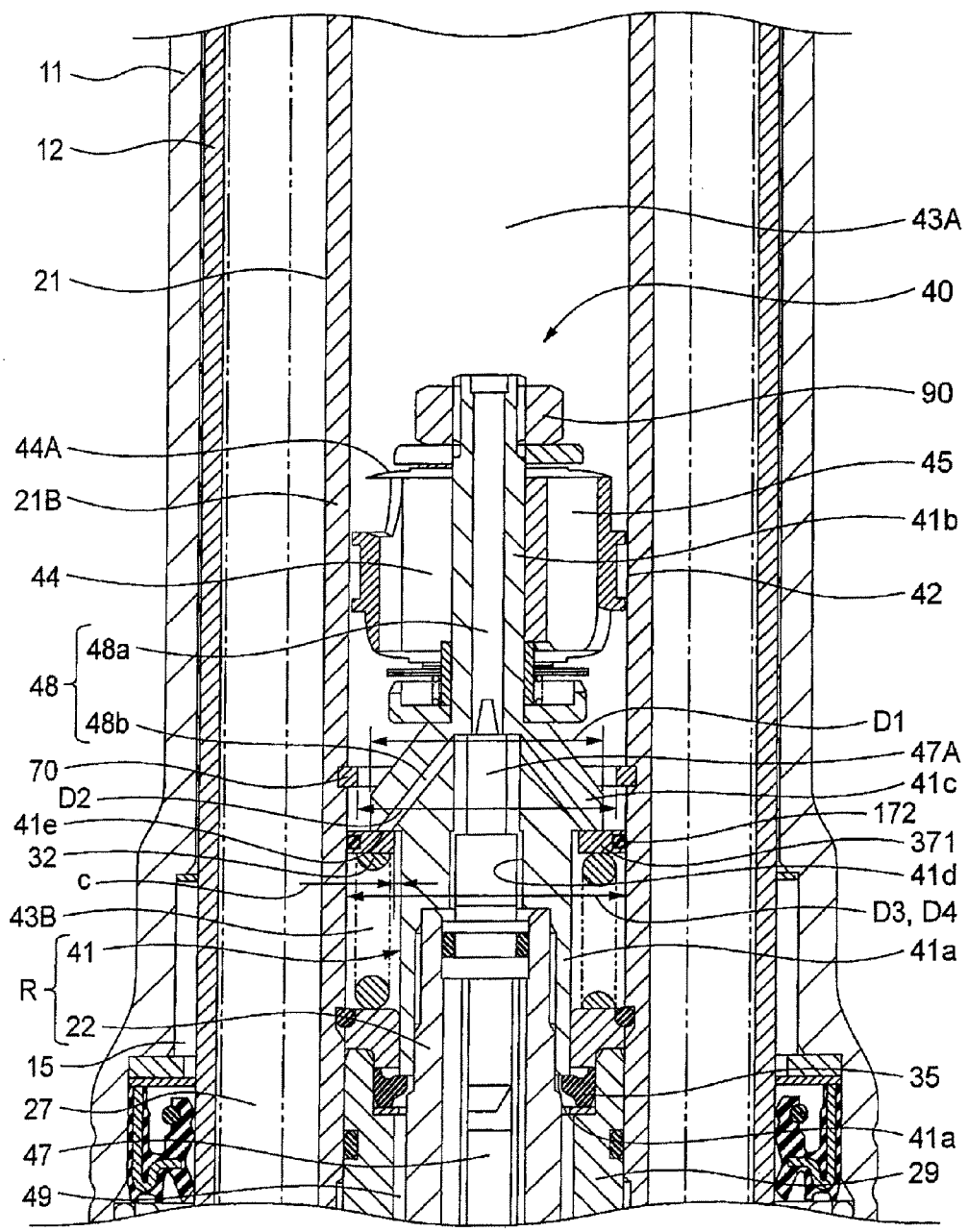
FIG. 7 is an enlarged sectional view of an essential part of a front fork according to one embodiment of the present invention, showing a piston valve device and its peripheral portion.

In this embodiment, the outer circumferential surface of the block ring 271 is formed with a plurality of sliding contact portions 271a adapted to slide on the inner circumferential surface of the damper cylinder 21 and a plurality of recesses 271b radially recessed from the sliding contact portions 271a and arranged in alternate relationship with the sliding contact portions 271a. The flow of oil is allowed by the recesses 271b. The depth of each recess 271b is set to a position radially inside of the stopper member 70. Accordingly, the block ring 271 can smoothly slide on the inner circumferential surface of the damper cylinder 21. Further, until the rebound spring 32 is compressively deformed to a maximum expanded condition of the front fork 10 after reaching the abutment of the lower end surface of the flange portion 41c of the piston holder 41 against the block ring 271, the blocking of oil flow by the block ring 271 can be prevented owing to the formation of the recesses 271b FIG. 7 is an enlarged sectional view of a part of a front fork according to yet another embodiment of the present invention. FIG. 7 illustrates, in part, a piston valve device 40 and its peripheral portion.

In this embodiment, the piston valve device 40 includes a block ring 371 having a circular outer circumferential surface adapted to come into full slidable contact with the inner circumferential surface of the damper cylinder 21. Accordingly, in the case of maximum expansion of the front fork, the block ring 371 can completely block the flow of oil, thereby performing an oil lock operation.

The remaining configuration and operation are similar to those described above in reference to FIGS. 1-3.

Having thus described several embodiments of the present invention, it should be noted that the present invention is not limited to the above preferred embodiments, but various design changes or modifications may be made without departing from the scope of the present invention.

Further, the hydraulic shock absorber of the present invention is not limited to a front fork as described above in some embodiment, but may be applied to a rear fork and any hydraulic shock absorber adapted to be mounted in a vehicle.

Description of Reference Symbols
10: Front fork (hydraulic shock absorber)
11: Body-side tube
12: Wheel-side tube
21: Damper cylinder
22: Piston rod body
27: Oil chamber
28: Gas chamber
29: Seal cap
32: Rebound spring
40: Piston valve device (expansion-side damping force generating device)
42: Main piston
43A: Piston-side oil chamber
43B: Rod-side oil chamber
50: Base valve device (contraction-side damping force generating device)
52: Subpiston
53: Subtank chamber
61: Free piston
71, 171, 271, 371: Block ring

I claim:
1. A hydraulic shock absorber, comprising:
a body-side tube;
a wheel-side tube slidably engaged with said body-side tube;
a damper cylinder axially extending in said body-side tube;
a piston rod axially extending in said wheel-side tube and inserted in said damper cylinder;
a piston, provided on said piston rod, configured to slide on the inner circumferential surface of said damper cylinder and to partition the inside space of said damper cylinder into a rod-side oil chamber and a piston-side oil chamber, said piston having a damping force generating device;
a bypass passage formed in said piston configured to allow the communication of said piston-side oil chamber and said rod-side oil chamber, said bypass passage comprising a first hole communicating with said piston-side oil chamber and a second hole communicating with said first hole and said rod-side oil chamber; and
a rebound spring supported at one end thereof by an end member mounted to a lower opening portion of said damper cylinder, the rebound spring configured to be compressively deformed in the case of maximum expansion of said piston rod;
wherein said piston rod has an axial side surface formed with an opening of said second hole exposed to said rod-side oil chamber, and
a block ring having a surface axially opposed to said opening of said second hole, wherein the entire block ring is provided around said piston rod at a position between said axial side surface of said piston rod and the other end of said rebound spring,
wherein, when said hydraulic shock absorber is expanded, said surface of said block ring comes into abutment against said axial side surface to close said opening of said second hole, wherein an annular stopper member abutting against said block ring biased by said rebound spring is fixed to an inner circumferential surface of said damper cylinder at a position between said axial side surface and said end member, wherein said piston rod is formed with a flange portion having said axial side surface, wherein an outer diameter of said flange portion is smaller than an inner diameter of said stopper member, and wherein an outer diameter of said block ring is larger than the inner diameter of said stopper member.

2. The hydraulic shock absorber according to claim 1, wherein a needle configured to adjust opening areas of said first hole and said second hole of said bypass passage is provided in said piston rod.

3. The hydraulic shock absorber according to claim 1, wherein:
   said piston rod is formed with a stepped cylindrical portion at a position between said flange portion and said end member; and
   a predetermined clearance is defined between an inner circumference of said block ring and an outer circumference of said stepped cylindrical portion of said piston rod radially opposed to each other in the case of maximum expansion of said piston rod.

4. The hydraulic shock absorber according to claim 1, wherein an outer circumferential surface of said block ring is in slidable contact with the inner circumferential surface of said damper cylinder, and said block ring has a plurality of axial through holes allowing the flow of oil.

5. The hydraulic shock absorber according to claim 1, wherein an outer circumferential surface of said block ring is formed with a plurality of sliding contact portions configured to slide on the inner circumferential surface of said damper cylinder and a plurality of recesses radially recessed from said sliding contact portions and arranged in alternate relationship with said sliding contact portions, wherein the flow of oil is allowed by the recesses.

6. The hydraulic shock absorber according to claim 1, wherein said block ring has a circular outer circumferential surface configured to come into full slidable contact with the inner circumferential surface of said damper cylinder.

7. A hydraulic shock absorber, comprising:
   body-side tube means;
   wheel-side tube means for slidably engaging with said body-side tube means;
   damper cylinder means for axially extending in said body-side tube means;
   piston rod means for axially extending in said wheel-side tube means and inserted in said damper cylinder means;
   piston means, provided on said piston rod means, for sliding on the inner circumferential surface of said damper cylinder means and partitioning the inside space of said damper cylinder means into a rod-side oil chamber and a piston-side oil chamber, said piston means having a damping force generating means;
   bypass passage means, formed in said piston, for allowing the communication of said piston-side oil chamber and said rod-side oil chamber, said bypass passage means comprising a first hole communicating with said piston-side oil chamber and a second hole communicating with said first hole and said rod-side oil chamber; and
   rebound spring means supported at one end thereof by an end member mounted to a lower opening portion of said damper cylinder means, the rebound spring means for compressively deforming in the case of maximum expansion of said piston rod means;

wherein said piston rod means has an axial side surface formed with an opening of said second hole exposed to said rod-side oil chamber, and block ring means, provided around said piston rod means, wherein the entire block ring means is positioned between said axial side surface of said piston rod means and the other end of said rebound spring means, for abutting against said axial side surface to close said opening of said second hole when said hydraulic shock absorber is expanded, the block ring means having a surface axially opposed to said opening of said second hole, wherein an annular stopper member means, abutting against said block ring means biased by said rebound spring means, is fixed to an inner circumferential surface of said damper cylinder means at a position between said axial side surface and said end member, wherein said piston rod means is formed with a flange portion having said axial side surface, wherein an outer diameter of said flange portion is smaller than an inner diameter of said stopper member means, and wherein an outer diameter of said block ring means is larger than the inner diameter of said stopper member means.

8. The hydraulic shock absorber according to claim 7, further comprising needle means, provided in said piston rod means, for adjusting opening areas of said first hole and said second hole of said bypass passage.

9. The hydraulic shock absorber according to claim 7, wherein:
   said piston rod means is formed with a stepped cylindrical portion at a position between said flange portion and said end member; and
   a predetermined clearance is defined between an inner circumference of said block ring means and an outer circumference of said stepped cylindrical portion of said piston rod means radially opposed to each other in the case of maximum expansion of said piston rod means.

10. The hydraulic shock absorber according to claim 7, wherein an outer circumferential surface of said block ring means is in slidable contact with the inner circumferential surface of said damper cylinder means, and said block ring means has a plurality of axial through holes allowing the flow of oil.

11. The hydraulic shock absorber according to claim 7, wherein an outer circumferential surface of said block ring means is formed with a plurality of sliding contact portions configured to slide on the inner circumferential surface of said damper cylinder means and a plurality of recesses radially recessed from said sliding contact portions and arranged in alternate relationship with said sliding contact portions, wherein the flow of oil is allowed by the recesses.

12. The hydraulic shock absorber according to claim 7, wherein said block ring means has a circular outer circumferential surface configured to come into full slidable contact with the inner circumferential surface of said damper cylinder means.

13. The hydraulic shock absorber according to claim 1, wherein said second hole is in direct communication with said first hole and said rod-side oil chamber.

14. The hydraulic shock absorber according to claim 7, wherein said second hole is in direct communication with said first hole and said rod-side oil chamber.

* * * * *